Feb. 21, 1939. H. W. KOENIG 2,147,980
FIELD AND GARDEN HOE
Filed March 1, 1937 2 Sheets-Sheet 1
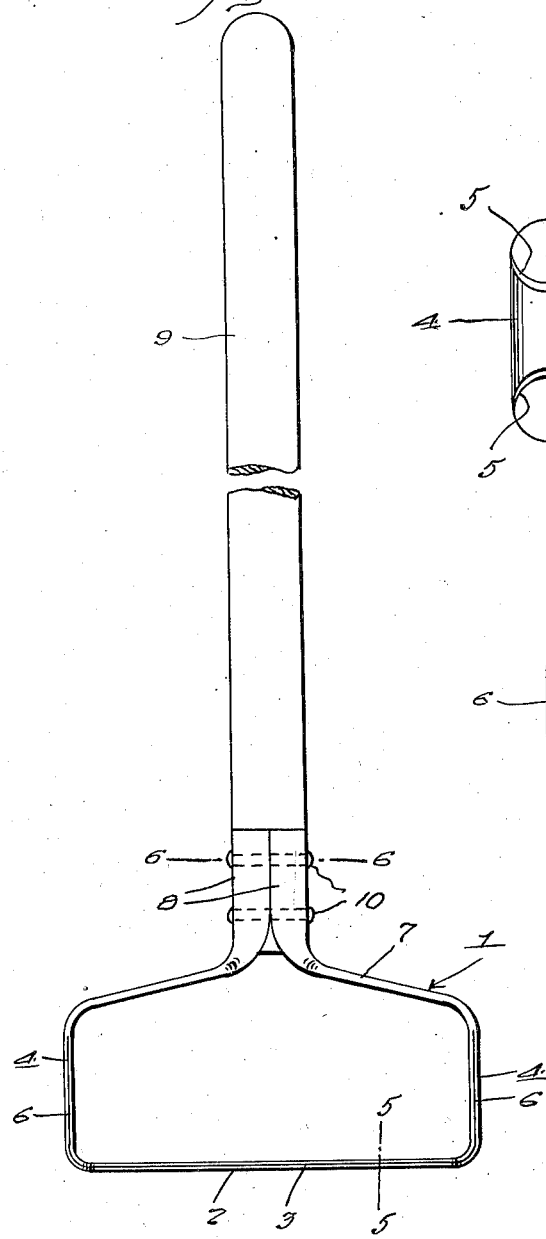
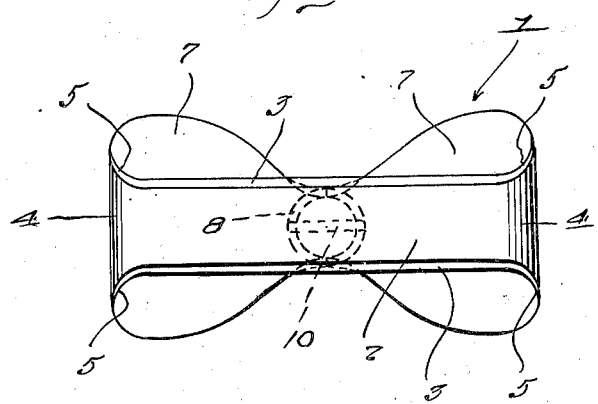
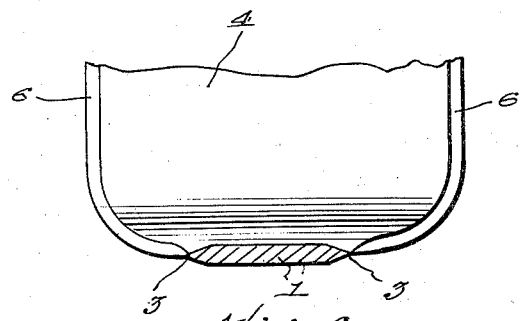
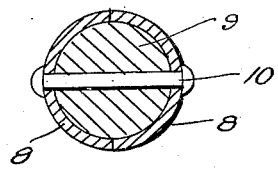
Inventor
H. W. Koenig
By Clarence A. O'Brien
Hyman Berman
*Attorneys*

Feb. 21, 1939.  H. W. KOENIG  2,147,980
FIELD AND GARDEN HOE
Filed March 1, 1937  2 Sheets-Sheet 2
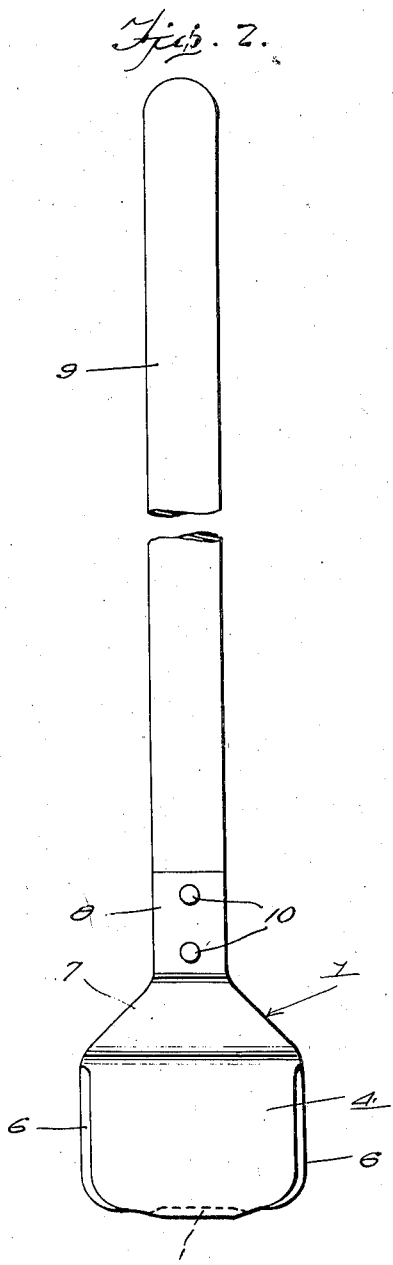
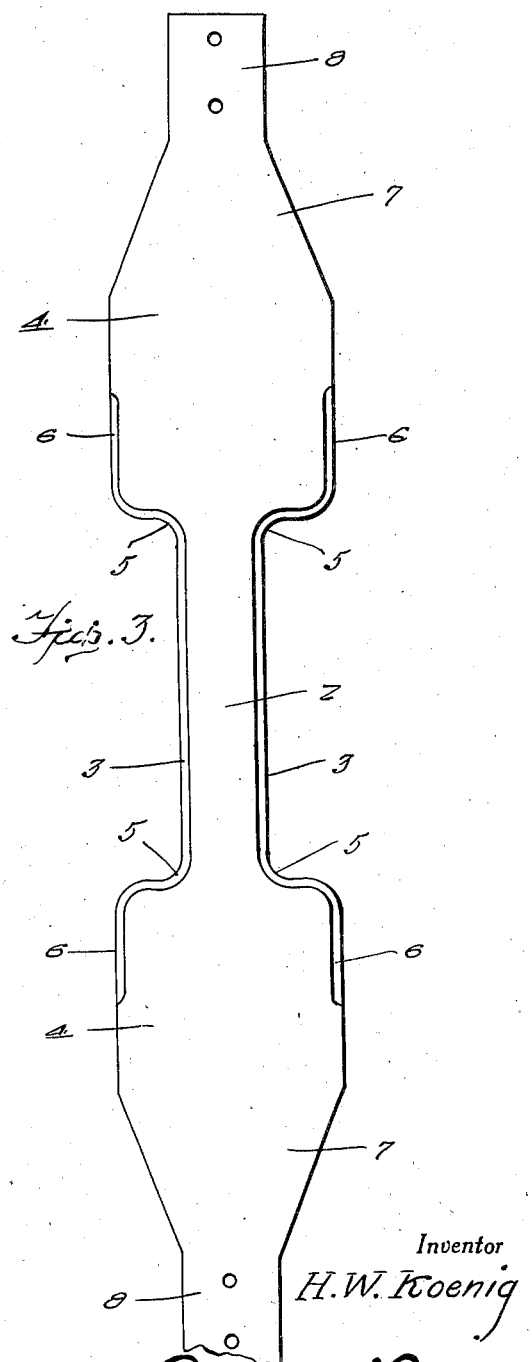
Inventor
H. W. Koenig
By Clarence A. O'Brien
Hyman Berman
Attorneys Patented Feb. 21, 1939

2,147,980

UNITED STATES PATENT OFFICE 2,147,980

FIELD AND GARDEN HOE

Herman W. Koenig, Loveland, Colo.

Application March 1, 1937, Serial No. 128,467

1 Claim. (Cl. 97—66)

The present invention relates to new and useful improvements in field and garden hoes and has for its primary object to provide, in a manner as hereinafter set forth, an implement of this character embodying a novel construction, combination and arrangement of parts whereby the person using the device may work close to young plants without injuring said plants even under unfavorable conditions, such as when the surface of the ground is crusted.

Another very important object of the invention is to provide a hoe of the aforementioned character wherein the blade is formed from a single piece of metal.

Other objects of the invention are to provide a field and garden hoe of the character described which will be comparatively simple in construction, strong, durable, highly efficient and reliable in use, light in weight, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of a field and garden hoe constructed in accordance with the present invention.

Figure 2 is a view in side elevation thereof.

Figure 3 is a plan view of the head, showing same before it is bent to form.

Figure 4 is a view in bottom plan of the invention.

Figure 5 is a sectional view, taken substantially on the line 5—5 of Figure 1.

Figure 6 is a view in horizontal section through the invention, taken substantially on the line 6—6 of Fig. 1.

Referring now to the drawings in detail, it will be seen that the embodiment of the invention which has been illustrated comprises a head which is designated generally by the reference numeral 1, said head being formed from a single piece of any suitable metal, as illustrated to advantage in Fig. 3 of the drawings. The head 1 includes a relatively narrow cross blade 2 having both edges sharpened, as at 3 and these edges are parallel as shown.

At the ends of the cross blade 2 are upstanding, opposed, uniformly spaced side blades 4, said side blades being comparatively wide. The end portions of the cross blade 2 connect with intermediate parts of the lower ends of the side blades 4, and at these points where the parts 2 and 4 are connected together each blade or part 4 is slightly curved inwardly as shown in Figure 1 and also in Figures 4 and 5. The vertical and lower edges of the side blades 4 are sharpened, as at 6, these cutting edges 6 merging with the cutting edges 3 of the cross blade 2. As shown more particularly in Figure 3 each cutting edge 6 is curved where it passes around each lower corner of a blade 4 and then curves in an opposite direction where it joins the cutting edge 3, as shown at 5 in Figure 3.

Formed integrally with the upper ends of the side blades 4 are inwardly converging, tapered arms 7 which terminate in upstanding, opposed free end portions 8 of substantially semi-circular cross section for the reception of one end portion of a handle 9 to which said end portions 8 are rigidly secured in any suitable manner, as by rivets or bolts 10.

It will thus be seen that the head 1 is formed from a single piece of metal. When the implement is in use the dirt which is loosened passes over the comparatively narrow cross blade 2 with a minimum of disturbance. The side blades 4 function as guides which may pass quite close to the plants without injuring same and cut the crust or surface of the ground, the construction and arrangement being such that the cutting edges of the side blades 4 precede the cross blade 2. When the device is used for thinning beets and the like the forward cutting edges of the blades 4 will act to remove all obstructions in front of the device, before the flat blade 2 encounters such obstructions and said edges of the blades 4 will cut the hard crust of the ground and thus enable the blade 2 to make a clean cut. Also these wide blades 4 act to keep all loose dirt, stirred up by the device, from falling on the young plants that are next to the cut, thus making it possible to hoe at considerable speed without covering the plant.

It is believed that the many advantages of a field and garden hoe constructed in accordance with the present invention will be readily understood and although a preferred embodiment of the implement is as illustrated and described, it is to be understood that changes in the details of construction and in the combination and arrangement of parts may be resorted to which will fall within the scope of the invention as claimed.

What is claimed is:—

A hoe of the class described comprising a pair of wide side blades of substantially rectangular shape vertically disposed in spaced apart relation and a flat narrow blade extending at right angles to the wide blades and having its ends connected with the lower ends of the wide blades at the central portions thereof, the side edges of the narrow blade being parallel and beveled to form cutting edges and the side edges and bottom edges of the wide blades being beveled to form cutting edges, the cutting edges of the lower ends of the wide blades merging in a smooth curve with the cutting edges of the narrow blade, the lower corners of each side blade being rounded, the space between the side blades being unobstructed.

HERMAN W. KOENIG.